United States Patent [19]
Krause

[11] 3,715,462
[45] Feb. 6, 1973

[54] METHOD AND CIRCUIT ARRANGEMENT FOR REGULATING THE AMPLITUDE OF THE COLOR SYNCHRONIZING SIGNAL

[75] Inventor: Gerhard Krause, Ebersberg/Munich, Germany

[73] Assignee: Fernseh GmbH, Darnstadt, Germany

[22] Filed: Aug. 31, 1970

[21] Appl. No.: 68,259

[30] Foreign Application Priority Data

Sept. 2, 1969 Germany........................P 19 44 37.8

[52] U.S. Cl...............................................178/5.4 CR
[51] Int. Cl................................................H04n 5/78
[58] Field of Search.........178/5.4 CR, 5.4 P, 5.4, 5.2

[56] References Cited

UNITED STATES PATENTS 3,381,083 4/1968 Jensen et al....................178/5.4 CR

*Primary Examiner*—Robert L. Griffin
*Assistant Examiner*—Donald E. Stout
*Attorney*—Ernest F. Marmorek

[57] ABSTRACT

A method for controlling the amplitude of the color synchronizing signal in color television signals taken from a record carrier, wherein amplitude deviations from the nominal value occur which exhibit a periodically recurring component, wherein there is derived from the color synchronizing signal a control voltage corresponding to the deviation of the amplitude of the color synchronizing signal from the nominal value, such control voltage being delivered through a low pass filter, and at the same time, in respect of each of those lines for which the periodically recurring component of the deviations is substantially equal, the control voltage is averaged over a plurality of periods of the periodically recurring component, and the mean values thus obtained, and the control voltage delivered through the low pass filter is used to influence the frequency response of the taken off color television signals in the sense of reducing the deviations in the amplitude of the color synchronizing signal from the nominal value.

3 Claims, 1 Drawing Figure

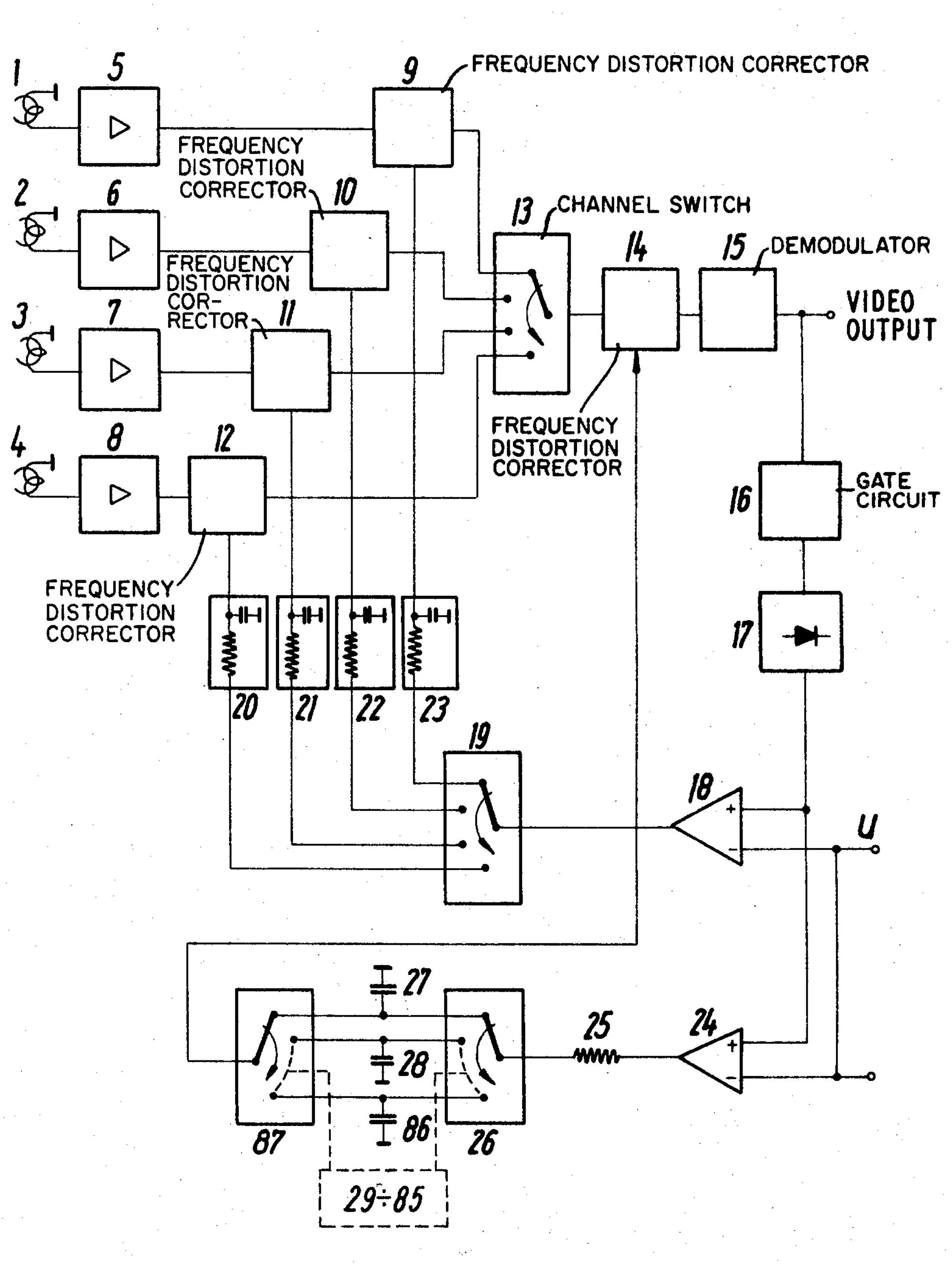
Inventor:
Gerhard Krause
by Emil F. Mannak (signature)
Attorney

METHOD AND CIRCUIT ARRANGEMENT FOR REGULATING THE AMPLITUDE OF THE COLOR SYNCHRONIZING SIGNAL

The invention also discloses a circuit arrangement for practicing the above method.

FIELD OF THE INVENTION

The present invention relates to a method and a circuit arrangement for regulating the amplitude of the color synchronizing signal of color television signals, which are taken off from a record carrier, wherein deviations from the nominal value of the amplitude take place exhibiting a periodically recurring component.

BACKGROUND OF THE INVENTION

In the reproduction of recorded color television signals it is possible for color saturation errors to occur due to differing amplitude-frequency responses in the recording and in the reproduction. These can be reduced by inserting frequency response distortion correctors in the path of the reproduced signals. If the frequency response distortion correctors are adjusted in such a manner that the color synchronizing signal is reproduced with the correct amplitude, then the color auxiliary carrier will also be reproduced with practically the correct amplitude so that no color saturation errors occur.

The present invention is based upon the knowledge that errors relating to the frequency response of the reproduced signals are composed of a plurality of components, of which those which are caused by the position of the recording upon the record carrier and by the deviations in the characteristics of the recording and reproducing heads in multiple head apparatus will recur substantially periodically.

For example, in the conventional transverse track recording method used for broadcasting purposes, tracks are described normal to the feed direction of a magnetic tape by means of four magnetic heads which are secured at the periphery of a rotating wheel, each of these tracks including about 16 lines. Even when using equipment of the highest mechanical precision variations occur in the force of application between the tape and the magnetic head wheel, which cause errors in frequency response, which may be different for each of the sixteen lines. Moreover variations as between the magnetic heads themselves can cause variations in the frequency responses, so that there may be corresponding frequency response errors which repeat themselves on an average after 16 lines. In this connection it may be observed that under the European standard in most cases switching over takes place to the next track after 15 lines.

SUMMARY OF THE INVENTION

The object of the present invention is to offer a method of automatically controlling the frequency response distortion correctors in such a manner that the amplitude of the color synchronizing signal corresponds as far as possible to the nominal value at reproduction.

The invention is characterized by the feature that there is derived from the color synchronizing signal a control voltage corresponding to the amount by which the amplitude of the color synchronizing signal deviates from the nominal value, that said control voltage is delivered through a low pass filter and at the same time, in respect of those lines for which the periodically recurring component of the deviations is substantially equal, averaging is effected over a plurality of periods of the periodically recurring component, and that the resulting mean values and the control voltage delivered over the low pass filter are employed to influence the frequency response of the taken off color television signals in the sense of reducing the deviations in the amplitude of the color synchronizing signal.

The error voltages are associated with very great statistical fluctuations, which generally are substantially greater than the permissible residual error of the control circuit. By reason of certain non-linearities as well as by reason of a limited swing range of the control circuit, these statistical disturbances influence the action of the control arrangement.

In order, nevertheless, to be able to perform the control operation, it is necessary that the error voltages be averaged over a number of lines as large as possible. The control effect exercised upon the characteristic curves by the statistical fluctuations increase with the control circuit amplification, which has the result that the greater is the number of lines which are utilized for forming the mean value, the greater can be the control circuit amplification which is selected. The number of available lines is however limited because the time constant of the control circuit may not be greater than about 0.1 second, in order that the human eye shall not be capable of recognizing the fluctuations.

The advantage of the method according to the invention consists in the fact that, in the one control circuit, a mean value can be taken over as great a number of lines as possible without having regard to the periodic component caused by the position of the recording upon the record carrier, which fact makes possible a high amplification of this control circuit. In the second control circuit, however, the periodic components of the errors can be taken into account, whilst the lines occurring in one period are separately evaluated, and therefore averaging can be effected over a smaller number of lines within a limited integration time.

BRIEF DESCRIPTION OF THE DRAWING

The invention will now be explained in more detail with reference to the accompanying single FIGURE which is a schematic illustration of a preferred embodiment of the invention in an exemplary fashion.

DESCRIPTION OF THE PREFERRED EMBODIMENT

As seen in the single FIGURE, reference numerals 1, 2, 3 and 4 are the four magnetic heads of a video magnetic recording system using the transverse track method, these being connected through a respective reproduction amplifier 5, 6, 7 and 8 and through a respective first frequency response distortion corrector 9, 10, 11 and 12 to the inputs of a channel switch 13. The channel switch conducts the signals of each magnetic head for so long as the head is in contact with the magnetic tape, whilst provision is additionally made so that switching over is effected only during the line flyback. The channel switch runs practically in synchronism with the wheel carrying the heads, not shown in the drawing, this taking place at a frequency of 250 Hz. From the channel switch 13 the color television signals are delivered to a second frequency response distortion corrector 14, which like the frequency response distortion correctors 9 to 12 is electrically controllable.

Because, in the magnetic recording apparatus which is basic to the illustrated circuit arrangement, the television signals are recorded as frequency modulated signals, a demodulator 15 is provided following the frequency response distortion corrector 14, and from the output of this demodulator the color television signals are delivered to a point for further processing and at the same time are delivered to a gate circuit 16. By means of the gate circuit 16, which is only conducting for the duration of the color synchronizing signal, the color synchronizing signal arrives at the rectifier device 17, at whose output a direct voltage appears, which is proportional to the amplitude of the color synchronizing signal. By means of the differential amplifier 18, the direct voltage is compared with a direct voltage U corresponding to the nominal amplitude of the color synchronizing signal. At the output of the differential amplifier 18 there is available a control voltage which corresponds to the deviation of the amplitude of the color synchronizing signal from the nominal value.

This control voltage is then delivered through a change-over switch 19, corresponding to the channel switch 13, and through a respective low pass filter 20, 21, 22 and 23 to the first set of distortion correctors 9 to 12. The time constants of the low pass filters can be selected as very high, which makes possible a high amplification of the control voltage in the differential amplifier 18. In this way errors which are relatively large, but which are relatively slow in appearance can be corrected to a large extent.

For the purpose of compensating the errors which occur from line to line, that is to say which occur relatively rapidly but periodically the output voltage of the rectifier device 17, as well as the nominal value voltage U are delivered to a further differential amplifier 24. The output voltage of the differential amplifier 24 passes through a resistance 25 to a changeover device 26, which connects the output of the differential amplifier 24 momentarily during each line to a respective one of the condensers 27 to 86.

During each line, one of the condensers 27 to 86 is selected by the changeover device 26 together with the resistance 25 forms an integration circuit. The particular one of the condensers 27 to 86 to be selected is determined by the number of the lines with the regularly recurring deviation. The condenser is charged up to a voltage which corresponds to the mean deviation occurring during those lines, which relates to the position upon the record carrier. The mean value thus resulting is then delivered through a further changeover device 87 to the second frequency response distortion corrector 14.

In a practically applied arrangement for a magnetic recording system having four heads, the following numerical values result. During the integration time of 0.1s averaging can be effected in the first control circuit over a number of lines equal to $$(0.1 \times 15{,}625)/4 \approx 400$$

The amplification was fixed at $V_1 = 100$. In the second control circuit, using an amplification of $V_2 = 20$ averaging was effected over a number of lines $$(0.1 \times 15{,}625)/(4 \times 5) \approx 27$$

The invention is not restricted to its use in quadruple head transverse recording systems. For example, periodically varying deviations of the frequency response, and thus of the color synchronizing signal, will occur also in the so-called oblique track magnetic recording devices and also in disc-type stores.

From the above, it is apparent that although the invention has been described hereinbefore with respect to a preferred method thereof and a specific embodiment for practicing such method, it is evident that many modifications and changes may be made without departing from the spirit of the invention. Accordingly, by the appended claims, we intend to cover all such modifications and changes as fall within the true spirit and scope of this invention.

I claim:

1. A method for controlling the amplitude of the color synchronizing signal in color television signals taken from a record carrier wherein amplitude deviations from the nominal value occur which exhibit a periodically recurring component, comprising the steps of deriving from the color synchronizing signal a control voltage corresponding to the deviation of the amplitude of the color synchronizing signal from the nominal value, applying said control voltage to the taken off color television signals through a low pass filter means to a first set of frequency distortion corrector means for a period exceeding one line, for correcting them, and at the same time averaging, in respect of each of those lines for which the periodically recurring component of the deviations is substantially equal, said control voltage in a storage device over a plurality of periods of the periodically recurring component, and selectively applying the averaged control signal from the storage device through a second frequency distortion correction means to the previously corrected signals for a period of one line to influence thereby the frequency response to the taken off color television signals in the sense of reducing the deviations in the amplitude for the color synchronizing signal from the nominal value.

2. A circuit arrangement for controlling the amplitude of the color synchronizing signal in color television signals taken from a record carrier by a plurality of periodically circulating reproduction heads, comprising a plurality of electronically controllable first frequency response distortion correctors for receiving the television signals from an assigned one of said reproduction heads therein, a second frequency response distortion corrector, first switching means connecting said second frequency response distortion corrector in synchronism with the operation of respective reproduction heads, a demodulator connected to the output of said second distortion corrector, a rectifier arrangement, a gate circuit connecting said rectifier arrangement to the output of said demodulator, said gate circuit being conductive only for the duration of the color synchronizing signal, a pair of subtraction circuits each connected with one of their inputs to the output of the rectifier arrangement, the other respective inputs of said subtraction circuits being supplied with a direct voltage representing the nominal value of the amplitude of the color synchronizing signal, a plurality of low pass filter means, second switching means synchronized with said first switching means and connecting through said low pass filter means the output of one of said subtraction circuits to respective control inputs of said first frequency response distortion correctors, a plurality of storage devices, the quantity of which being selected according to the number of the regularly recurring lines during the scanning period of one reproduction head, a resistance and an electronic changeover switch connecting the output of said second subtraction circuit to said storage devices, a further electronic changeover switch connecting said storage devices to the control input of said second frequency response distortion correction, each of said electronic changeover switches operating substantially in synchronism with the occurrence of respective lines, thereby applying additional control signal for compensating periodically occurring amplitude distortions in said lines.

3. A circuit arrangement according to claim 2 wherein said storage devices are capacitors and the integration time defined by respective capacitors and said resistance is below 0.1 second.

* * * * *